Figure 1:
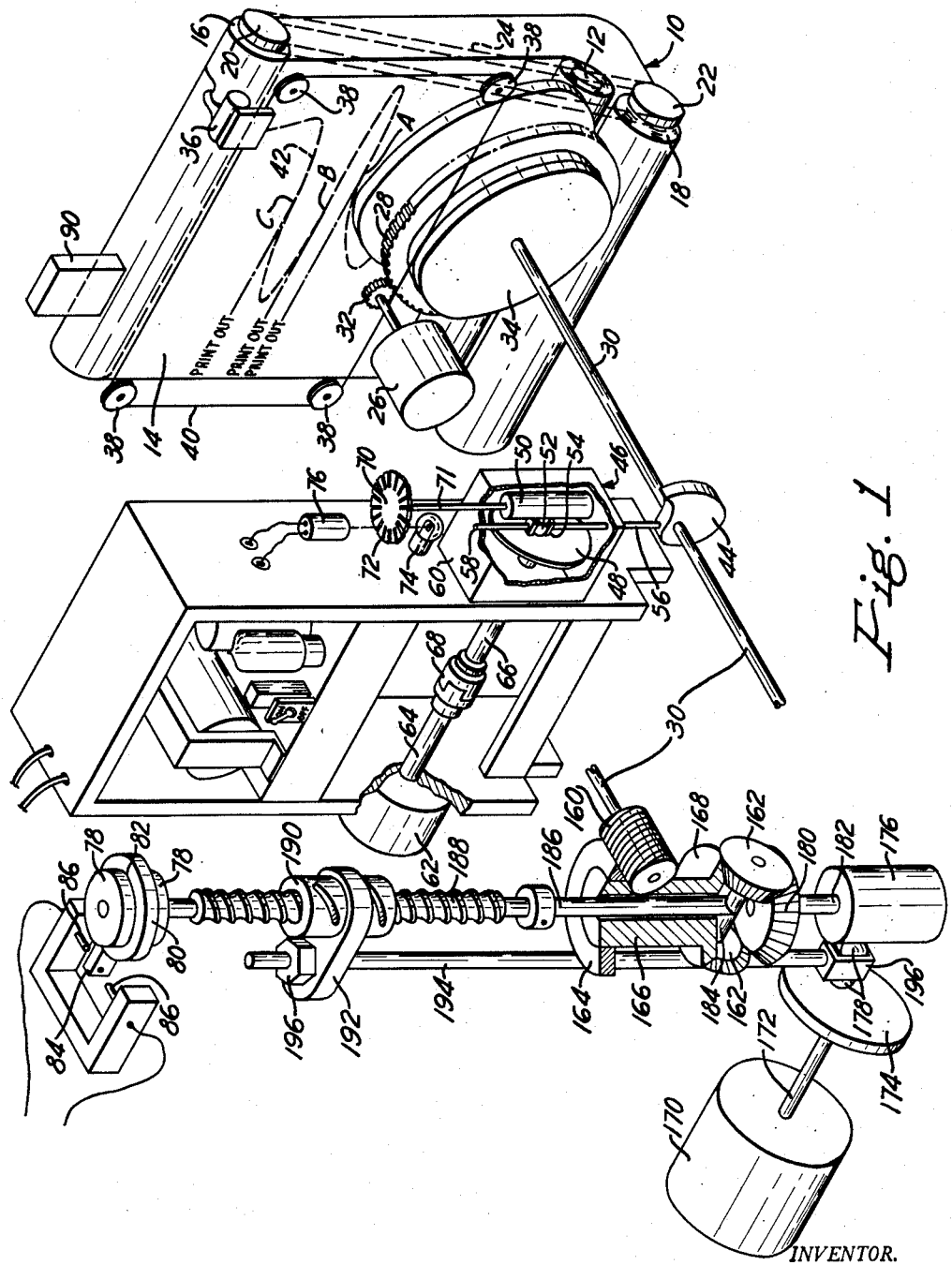

Jan. 14, 1964 C. L. WOLFE 3,118,058
APPARATUS FOR THE AUTOMATIC DETECTION OF RECURRING POINTS OF
INFLECTION IN VALUES OF A FIRST VARIABLE OR SIGNAL
VERSUS A SECOND VARIABLE SUCH AS TIME
Filed Sept. 28, 1960 2 Sheets-Sheet 1

INVENTOR.
COURT L. WOLFE
BY
ATTORNEY

INVENTOR.
COURT L. WOLFE
BY
ATTORNEY

United States Patent Office 3,118,058
Patented Jan. 14, 1964

3,118,058
APPARATUS FOR THE AUTOMATIC DETECTION OF RECURRING POINTS OF INFLECTION IN VALUES OF A FIRST VARIABLE OR SIGNAL VERSUS A SECOND VARIABLE SUCH AS TIME
Court L. Wolfe, Pittsburgh, Pa., assignor to Gulf Research & Development Company, Pittsburgh, Pa., a corporation of Delaware
Filed Sept. 28, 1960, Ser. No. 58,985
11 Claims. (Cl. 235—183)

This invention relates to an apparatus for the automatic detection of recurring points of inflection in values of a first variable or signal versus a second variable such as time.

The apparatus of this invention allows automatic detection and signaling of inflectional points of curvature from concave to convex as would be indicated during recording of a curve of a fluctuating variable no matter whether such inflection points recur at the same or differing values. Therefore, where a record of a fluctuating variable exhibits recurring inflection points the apparatus of this invention is not limited by fixed set points but permits signaling of all such inflection points as they occur even though no two inflection points occur at the same value.

The precise points of inflection from concave to convex in a curve are often difficult to ascertain by observation of a recorded curve. Generally, in order to accurately ascertain the inflection points of a curve it is necessary to twice differentiate the curve and obtain the zero intercept of the second derivative. However, with the apparatus of this invention inflection points are signaled while only obtaining the first derivative. The apparatus employed comprises measuring means for measuring a first variable, a continuously self-balancing differentiating means for differentiating said first variable, moveable measuring output means extending from said measuring means to said diffentiating means, the extent of movement of said measuring output means being proportional to the output signal of said measuring means, the movement of said measuring output means constituting a first input to said differentiating means, moveable means responsive to a second variable such as time extending to said differentiating means, the movement of said second variable responsive means constituting a second input to said differentiating means, said differentiating means having moveable output means, moveable contact means on said differentiating output means moveable with said differentiating output means, said moveable contact means being disposed between a pair of spaced external opposing fixed contacts in electrical circuit with a means for signaling points of inflection of the first variable, said moveable contact means only being moveable with said differentiating output means until engagement is made between said moveable contact means and an external fixed contact whereupon said moveable contact means is only moveable with said differentiating output means upon reversal of direction of movement of said differentiating output means, such reversal of direction of movement causing concomitant disengagement between said moveable contact and external fixed contact, said disengagement electrically effecting response in said means for signaling points of inflection.

The moveable measuring output means and the moveable differentiating output means can each be constructed for either linear or rotary motion. Advantageously, each of these output means are adapted for rotary motion, for example, each can comprise a rotatable shaft.

When the moveable differentiating output means comprises a rotary shaft, a friction collar having a moveable switch contact extending radially outward from a point on its circumference is fitted around the shaft. The moveable contact is disposed between a pair of external fixed contacts and the collar is fastened around the shaft with only a sufficient degree of tightness so that it rotates together with the shaft as a single rigid body when the moveable contact is not engaged by an external fixed contact but with an insufficient degree of tightness to permit rotation of the collar with the shaft after the moveable contact has engaged an external contact. In this manner the external fixed contacts act as mechanical stops or obstructions and upon engagement with the moveable contact prevent further rotation of the collar with the rotary shaft until the rotary shaft reverses its direction of rotation. Upon such reversal of direction of rotation the collar, because of its frictional attachment to the shaft, again rotates together with the shaft as a single rigid body until the moveable contact again engages an external fixed contact which thereupon prevents further rotation of the collar with the rotary shaft until the rotary shaft again reverses its direction of rotation.

It is seen that when the moveable contact meets an external fixed contact and the shaft continues to rotate in the same direction, the collar acts as a slip clutch and ceases to rotate while the shaft continues to rotate in that direction. This slip clutch action continues until the direction of rotation of the shaft is reversed, whereupon the friction between the collar and the shaft causes the collar to rotate with the shaft until either contact is made with the other external fixed contact or until the moveable contact returns to the same fixed contact without first engaging the other external fixed contact.

Alhough the switching means can be employed to actuate any electrically operated signal, in one embodiment of this invention the switching device is employed to actuate the digital print-out and clearing mechanism of an integrator to which is being fed an output signal from the measuring instrument and which integrates the variable being measured with respect to time. The use of the switching means of this invention cooperatively with a measuring instrument and integrator equipped with print-out means can accomplish print-out of the integral of the quantity being measured which has accrued only between consecutive inflection points of the measured variable. Print-out of the total count accruing between adjacent inflection points followed by clearing of the integrator occurs substantially concomitantly with the occurrence of each inflection point in the record of the variable being measured. If desired, such print-out and clearing can occur at alternate inflection points rather than at succeeding inflection points as indicated by a record of the measured variable.

It is a particularly advantageous embodiment of this invention that the integrator print-out and clearing means or whatever other signal is being employed to indicate or record occurrence of inflection points in a record of the measured variable be actuated upon disengagement of the moveable switch contact from an external fixed contact rather than upon engagement of the moveable switch contact with an external fixed contact. By causing such actuation to occur only upon disengagement of the moving contact from a fixed contact the signal is actuated substantially concurrently with occurrence of an inflection point since such occurrence is first detectable only upon instantaneous change of direction of rotation of the output means of the differentiating means which, because of the frictional engagement between this output means and the moveable switch collar, causes concomitant disengagement of the moveable switch from the external fixed contact with which it is in contact. Therefore, disengagement is the occurrence which most precisely indicates inflection. On the other hand, if actuation of the signal means were to occur upon engagement of the moving switch contact with the opposite fixed external contact such actuation would have to await travel of the moveable switch across the gap between the pair of fixed external contacts. Such travel of the moveable switch across this gap prior to the signaling of an inflection point would unnecessarily introduce an error and therefore the signal would not be actuated precisely at the inflection point. This error can be considerable since in some processes the gap between the fixed external contacts might have to be relatively great in order to avoid continual electrical chattering or excessively frequent print-outs.

Figure 2:
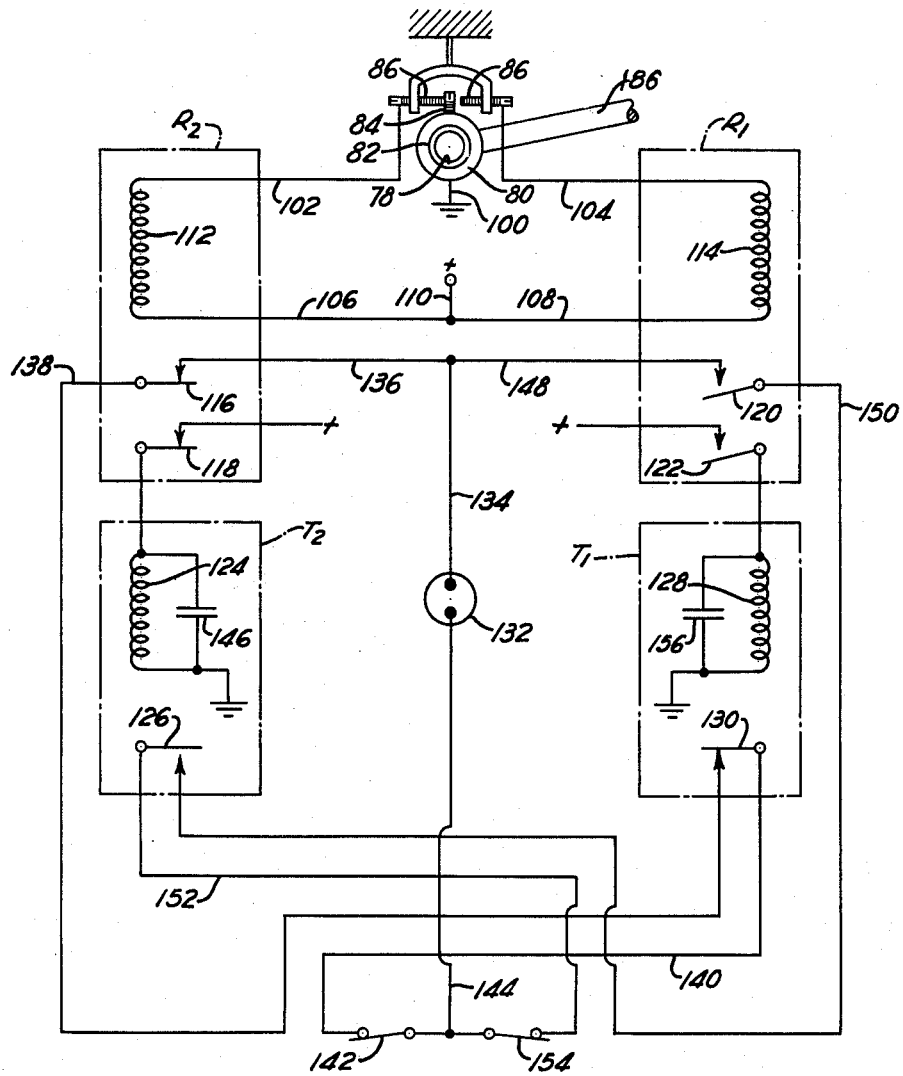

This invention is more completely illustrated by reference to the accompanying drawings in which FIGURE 1 shows the combination of a recorder, integrator, differentiating means and slip clutch switch and FIGURE 2 shows the electrical circuit for actuating an inflection point signaling device of which the slip clutch switch is a part.

Referring to FIGURE 1, the numeral 10 indicates generally a self-balancing potentiometric strip chart recorder. The recorder 10 comprises a supply roll of chart paper 12 from which chart paper 14 is entrained over a roll 16 and take-up roll 18. The rolls 16 and 18 are provided with pulleys 20 and 22, respectively, over which a belt 24 is entrained, and means, not shown, is provided for driving the rolls 16 and 18 at such a rate that the speed of advance of the chart paper 14 over the roll 16 is constant. Means, not shown, is provided to maintain tension on the chart paper 14 as it passes between the rolls 16 and 18.

The balancing motor 26 of the self-balancing recorder 10 is drivingly connected to a spur gear 28 fixed upon a slide wire shaft 30 by means of a small pinion gear 32 carried on the shaft of the motor 26. Secured to the slide wire shaft 30 in a position adjacent the gear 28 is a drum or disk 34 by means of which a recording pen 36 is driven in relation to the chart paper 14 as it passes over the roll 16. The arrangement for driving the pen 36 from the drum 34 comprises four idler pulleys 38 over which an endless pen drive cable 40 is entrained, with the portion of the cable 40 passing between the lowermost of the pulleys 38 being looped about the drum 34, as shown. The recording pen 36 is secured by an suitable means to the cable 40 at a position intermediate the uppermost of the pulleys 38, it being understood that the pen 36 is provided with suitable guiding means to maintain the same in proper contact with the chart paper 14.

Thus, the motor 26 rotates the slide wire shaft 30 through the driving connection established by the gears 28 and 32. The shaft 30 in turn causes the drum 34 to rotate therewith, thus causing linear movement of the cable 40 and the pen 36, so that the pen 36 marks upon the chart paper 14 a tracing 42 which is equivalent to a record of the angular displacement of the shaft 30 versus time. It will be understood of course that the angular position of the shaft 30 is directly proportional to the value of the variable electrical input signal being recorded, so that the trace 42 constitutes a record of such input signal versus time.

The description of apparatus for integrating the angular displacement of the shaft 30 (the angular displacement of the shaft 30 being proportional to the instantaneous value of the input signal being recorded) with respect to time follows. The shaft 30 has fixed thereon a constant rise cam 44. A conventional mechanical integrating device is indicated generally at 46, the same comprising a disk 48, a cylinder 50 mounted to rotate about an axis normal to the axis of the disk 48, and a pair of balls 52 disposed between the disk 48 and the cylinder 50. The pair of balls 52 constitute motion transferring means and establish a frictional driving connection between the disk 48 and the cylinder 50 and are carried in a sleeve 54. The sleeve 54 is secured at one side to a cam follower 56 and at the other side to a support arm 58. The cam follower 56 and the support arm 58 slidably extend through suitable openings in the opposite sides of a housing 60 provided for the integrating device 46, the arrangement being such that the pair of balls 52 are free to travel only along a path parallel to the axis of the cylinder 50.

The end of the cam follower 56 remote from the pair of balls 52 slidingly engages the constant rise cam 44. If deemed necessary or expedient, spring or weighting means, not shown, can be provided for yieldingly urging the cam follower 56 into continuous engagement with the cam 44. As thus far described, it will be evident that the pair of balls 52 will be caused to move along a path parallel to the axis of the cylinder 50 to an extent proportional to the angular displacement of the shaft 30. Normally, the position of the cam 44 on the shaft 30 or the length of the cam follower 56 is such that the pair of balls 52 is positioned centrally of the disk 48 when the shaft 30 is in the angular position occupied by it when the value of the input signal is zero.

Means is provided for rotating the disk 48 which comprises a constant speed electric motor 62, motor 62 being drivingly connected to the disk 48 by means of a motor shaft 64, and a shaft 66 centrally secured to the disk 48, with the adjacent ends of the shaft 64 and 66 being coupled together as at 68.

The means for measuring the angular displacement of the cylinder 50 in part comprises means for producing an electrical signal upon each equal increment of angular displacement of the cylinder 50, which in the preferred construction, takes the form of a disk 70 fixed upon an axial shaft 71 carried by the cylinder 50. The shaft 71 can be considered the output shaft of the mechanical integrating device. The disk 70 is provided with a plurality of equally spaced peripheral notches 72 that extend entirely around the circumference of the disk 70. An electric lamp 74 and a photoelectric cell 76 are disposed on opposite sides of the disk 70 in such an arrangement that light from the lamp 74 reaches the photoelectric cell 76 only when one of the notches 72 is disposed directly therebetween. With such an arrangement, rotation of the cylinder 50 results in the photoelectric cell 76 being intermittently illuminated by light from the lamp 74 as the notches 72 pass therebetween. The cell 76 produces an electrical potential or signal upon each occurrence of equal increments of rotation of the cylinder 50.

The signals or pulses from cell 76 are transmitted to a counting mechanism in print-out and clearing device 90 by means not shown. Print out and clearing device 90 is located in print-out proximity to chart 14 and print-out on chart 14 followed by clearing of the counting mechanism is caused to occur at print-out and clearing device 90 when this device is actuated by switch means as explained thereinafter.

Shaft 30 extends beyond cam 44 and terminates with a worm gear 160 to provide a first input to the differentiating means. The differentiating means is made of three components: a differential, a ball and disk motion transferring means and a feedback mechanism. The differential is made up generally of spool piece 166, gear 180, bevel gears 162, axle 184 and shaft 186. The motion transferring means comprises generally disk 174, balls 178 and cylinder 176. The feedback mechanism comprises generally low friction screw gear 188, floating gear 190, bracket 192, nut 196, rod 194 and housing 196.

The rotation of worm gear 160 constitutes one input signal to differential bevel gears 162. Worm gear 160 engages the upper geared rim 164 of spool piece 166. Lower geared rim 168 of spool piece 166 is in engagement with differential bevel gears 162. A second input, which is time in this example, is fed to the differentiating means by constant speed motor 170 having a shaft 172 terminating with disk 174. Rotational motion of disk 174 is transferred to cylinder 176, which has an axis perpendicular to the axis of disk 174, by a motion transferring means such as a pair of balls 178. The greater the distance of the balls 178 from the center of the disk 174 the greater the speed transmitted from disk 174 to cylinder 176. The rotation of cylinder 176 is transmitted to gear 180 through shaft 182.

Bevel gears 162 are each free to rotate about horizontal axle 184 so that any difference in speed of rotation of spool piece 166 relative to gear 180 causes differential gear wheels 162 to rotate about axle 184 in turn causing these wheels to revolve, thereby causing rotation of vertical shaft 186 attached to the midpoint of axle 184. Shaft 186 extends upwardly from axle 184 through an axial opening in spool piece 166 and in a position above spool piece 166 has secured to it a low friction mechanism for converting rotary to linear motion such as low friction screw gear 188 which acts as an internal gear for a floating mating external gear 190. Since internal gear 188 is stationary any rotation of gear 188 results in vertical movement in floating external gear 190 which vertical movement is fed back to the differential.

Feedback is accomplished by means of bracket 192 secured fixedly on one end about floating gear 190 and on the other end to a vertical rod 194 by means of an upper nut 196 and a lower nut, not shown. Rotation differential 162 is thereby converted to vertical movement in rod 194 which in turn adjusts the vertical positioning of balls 178 since the balls are encased in a housing 196 attached to the lower end of rod 194. Such vertical adjustment of balls 178 continues until the speed of gears 180 and 168 are the same whereupon movement of differential gear 162 ceases.

The feedback process is repeated upon any change in rotational speed of input gear 160. When input gear 160 is not rotating, as is the case when the variable being measured is constant, the feedback mechanism positions balls 178 at the center of disk 174 whereby no motion is transferred from disk 174 to cylinder 176. Upon change in value of the variable being measured, the feedback mechanism repositions balls 178 to provide a null balance upon differential gears 162.

Attached to the differentiating means output shaft 186 is a switch mechanism comprising a hub 78 which constitutes an enlargement of shaft 186 and which is integral with or fixedly attached to shaft 186. The purpose of hub 78 is to provide an enlarged line of contact 82 for the frictional inner surface of collar 80 with which hub 78 is in contact. Line of contact 82 between hub 78 and collar 80 is of sufficient length to provide positive frictional contact between hub 78 and collar 80 so that collar 80 rotates rigidly with shaft 186 until switch contact 84 engages one or the other of external fixed contacts 86. Following such engagement the shaft remains free to continue rotation in the same direction and hub 78 slidingly rotates past collar 80. Upon reversal of direction of rotation of shaft 186 the frictional contact between hub 78 and collar 80 causes the collar to rotate with the shaft until engagement is again made between switch contact 84 and an external fixed contact whereupon the sequence is repeated. In this manner the switch operates as a floating inflection point detector.

Reference to tracing 42 on chart paper 14 shows a fluctuating curve of a variable being measured. As shown in tracing 42 the inflection points, the points at which the curve changes from concave in one direction to concave in the opposite direction, are difficult to ascertain by observation. Furthermore, the inflection points do not recur at a constant value of the variable.

Points A, B and C indicate three inflection points in tracing 42. In the course of pen travel, as the pen just passes inflection point A in its movement to point B there occurs a change in direction of rotation in differential output shaft 186. This change in direction of rotation causes disengagement between contacts 84 and an external contact 86 which disengagement in turn effects a signal such as, for example, print-out and clearing at integrator print-out mechanism 90. This print-out and clearing occurs substantially at the precise time intercept on chart 14 at which inflection point A occurred. In the course of pen travel from point A to point B, contact 84 quickly traverses the gap between opposing contacts 86 and no further change in direction of rotation of shaft 186 occurs until pen travel reaches inflection point B at which time disengagement between contacts 84 and a contact 86 again causes print-out and clearing. The next change in direction of rotation of shaft 186 occurs at inflection point C.

FIGURE 2 illustrates an electrical circuit for causing print-out and clearing upon direction reversal of shaft 30. The circuit of FIGURE 2 contains two pairs of relays, one pair designated as $R_2$ and $T_2$, respectively, and the other pair designated as $R_1$ and $T_1$, respectively. In relay $R_2$, coil 112 actuates switches 116 and 118 in unison and in relay $T_2$ coil 124 actuates switch 126. In relay $R_1$, coil 114 actuates switches 120 and 122 and in relay $T_1$, coil 128 actuates switch 130.

The movement of contact 84 between opposing fixed contacts 86 is similar to operation of a single-pole double-throw switch. When moveable contact 84 engages the fixed contact 86 as shown in FIGURE 2 a circuit is completed from ground wire 100 through 80, 84, 86, 102, 112, 106 and 110, thereby energizing coil 112. At the same time coil 114 of relay $R_1$ is de-energized. Upon energization of coil 112, switches 116 and 118 are closed. Thereupon, a circuit is completed through print demand switch 132 which actuates print-out device 90 shown in FIGURE 1, 134, 136, 116, 138, normally closed switch 130, 140, manual switch 142, and 144. At the same time a circuit is completed through switch 118 and coil 124, thereby energizing both coil 124 and capacitor 146 which is in parallel with coil 124.

With the print demand switch circuit closed, integration and counting proceeds until the direction of rotation of shaft 186 is reversed whereupon moveable contact 84 disengages from the fixed contact 86 with which it is in engagement causing coil 112 to become de-energized, thereby opening switches 116 and 118 and thereby interrupting current flow through print demand switch 132 and causing print-out and clearing on chart 14 of FIGURE 1. If movement of shaft 186 is rapid and contact 84 instantaneously engages opposing fixed contact 86 the print-out and clearing mechanism will not have sufficient time for mechanical operation before it is reactuated by energization of relay $R_1$. Therefore, such instantaneous re-energization is prevented by means of capacitor 146 in relay $T_2$ which contains a sufficient residual charge to maintain coil 124 energized, thereby preventing closure of switch 126 and preventing current flow through print demand switch 132 for a sufficient length of time to allow the printing mechanism to print-out and clear itself before counting starts again. Capacitor 146 is of adequate size to provide the necessary time lapse, for example, about 0.2 second.

Upon engagement between moveable contact 84 and the opposing fixed contact 86 a circuit is completed through ground wire 100, 80, 84, 86, 104, 114, 108 and 110, thereby energizing coil 114 of relay $R_1$. Energization of coil 114 effects closure of switches 120 and 122. Closure of switch 122 results in energization of coil 128, thereby opening normally closed switch 130. Closure of switch 120 completes a circuit through 120, 150, normally closed switch 126, 152, manual switch 154, 144, 132, 134 and 148, thereby initiating integrating and counting which proceeds until print-out again occurs upon disengagement of moveable contact 84 and the fixed contact 86 with which it is in engagement. Upon such disengagement, capacitor 156 operates as a time delay means to allow a sufficient hold-up interval for the print-out mechanism to print and clear prior to commencing integration again.

Both fixed contacts 86 are equipped with kerfs for independent adjustment relative to moveable contact 84. Excessively close adjustment will result in excessive print-outs while excessively wide adjustment will result in unnecessary introduction of error. With both manual switches 142 and 154 closed print-out and clearing occurs at each successive inflection point. If desired, either of switches 142 or 154 can be manually opened so that print-out and clearing occurs only at inflection points where the curve becomes concave upward or only at inflection points where the curve becomes concave downward.

Various changes and modifications may be made without departing from the spirit of this invention and the scope thereof as defined in the following claims.

I claim:

1. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, said moveable contact means being disposed between a pair of spaced external opposing fixed contacts in circuit with a means for signaling points of inflection of the first variable with respect to the second variable, said moveable contact means being movable with said differentiating output means until engagement is made between said moveable contact means and an external fixed contact whereupon said moveable contact means is only moveable with said differentiating output means upon reversal of direction of movement of said differentiating output means, such reversal of direction of movement causing concomitant disengagement between said moveable contact and external fixed contact.

2. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, said moveable contact means being disposed between a pair of spaced external opposing fixed contacts in circuit with a means for signaling points of inflection of the first variable with respect to the second variable, said moveable contact means being moveable with said differentiating output means until engagement is made between said moveable contact means and an external fixed contact whereupon said moveable contact means is only moveable with said differentiating output means upon reversal of direction of movement of said differentiating output means, such reversal of direction of movement causing concomitant disengagement between said moveable contact and external fixed contact, said disengagement effecting response in said means for signaling points of inflection.

3. An apparatus comprising measuring means for measuring a first variable, differentiating means for differentiating said first variable with respect to a second variable, rotatable measuring output means extending from said measuring means to said differentiating means, the rotation of said measuring output means constituting a first input to said differentiating means, rotatable means responsive to said second variable extending to said differentiating means, the rotation of said second variable responsive means constituting a second input to said differentiating means, rotatable differentiating output means, moveable contact means on said differentiating output means rotatable with said differentiating output means, said moveable contact means being disposed between a pair of spaced external opposing fixed contacts in circuit with a means for signaling points of inflection of the first variable with respect to the second variable, said moveable contact means being rotatable with said differentiating output means until engagement is made between said moveable contact means and an external fixed contact whereupon said moveable contact means is only rotatable with said differentiating output means upon reversal of direction of rotation of said differentiating output means, such reversal of direction of rotation causing concomitant disengagement between said switch and external fixed contact, said disengagement effecting response in said means for signaling points of inflection.

4. An apparatus comprising measuring means for measuring a first variable, differentiating means for differentiating said first variable with respect to a second variable, said differentiating means including a differential, moveable measuring output means extending from said measuring means to said differential, the movement of said measuring output means comprising a first input to said differential, moveable means responsive to said second variable, ball and disk means between said second variable responsive means and said differential for transferring the motion of said variable responsive means to said differential constituting a second input to said differential, moveable differential output means, feedback means extending between said moveable differential output means and said ball and disk means adapted for the correction of unbalance between said first input to said differential and said second input to said differential, moveable contact means on said differential output means moveable with said differential output means, said moveable contact means being disposed between a pair of spaced external opposing fixed contacts in circuit with a means for signaling points of inflection of the variable being measured, said moveable contact means being moveable with said differential output means until engagement is made between said moveable contact means and an external fixed contact whereupon said moveable contact means is only moveable with said differential output means upon reversal of direction of movement of said differential output means, such reversal of direction of movement causing concomitant disengagement between said moveable contact and external fixed contact.

5. An apparatus comprising measuring means for measuring a variable, integrating means for integrating the measurement with respect to time, said integrating means having a print-out means, a self-balancing differentiating means for differentiating said variable, at least one moveable measuring output means, at least one of said measuring output means extending between said measuring means and said integrating means for transmitting the output of the measuring means to the integrating means, at least one of said measuring output means extending from said measuring means to said differentiating means, the movement of said measuring output means constituting a first input to said differentiating means, moveable time responsive means extending to said differentiating means, the movement of said time responsive means constituting a second input to said differentiating means, moveable differentiating output means, moveable contact means on said differentiating output means moveable with said differentiating output means, said moveable contact means being disposed between a pair of spaced external opposing fixed contacts in circuit with said print-out means, said moveable contact means only being moveable with said differentiating output means until engagement is made between said moveable contact means and an external fixed contact whereupon said moveable contact means is only moveable with said differentiating output means upon reversal of direction of movement of said differentiating output means, such reversal of direction of movement causing concomitant disengagement between said moveable contact and external fixed contact, said disengagement effecting print-out in said print-out means.

6. An apparatus comprising measuring means for measuring a variable, differentiating means for differentiating said variable, said differentiating means having a differential means, rotatable measuring output means extending from said measuring means to said differential means, the rotation of said measuring output means constituting a first input to said differential means, rotatable time responsive means extendings to a ball and disk motion transferring means, said ball and disk extending to said differential for transferring the motion of said time responsive means to said differential constituting a second input to said differential, rotatable differential output means, feedback means linking said differential output means and the balls in said motion transferring means for adjusting the position of the balls in said motion transferring means upon rotation of said rotatable differential output means to correct unbalance between said first input to said differential and said second input to said differential, moveable contact means on said differential output means rotatable with said differential output means, said moveable contact means being disposed between a pair of spaced external opposing fixed contacts in circuit with a means for signaling points of inflection of the variable being measured, said moveable contact means being rotatable with said differential output means until engagement is made between said moveable contact means and an external fixed contact whereupon said moveable contact means is only rotatable with said differential output means upon reversal of direction of rotation of said differential output means, such reversal of direction of rotation causing concomitant disengagement between said moveable contact and external fixed contact, said disengagement effecting response in said means for signaling points of inflection.

7. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, an external fixed contact in circuit with a means for signaling points of inflection of the first variable with respect to the second variable disposed in the path of movement of said moveable contact means, said moveable contact means being moveable with said differentiating output means only until engagement is made between said moveable contact means and said external fixed contact whereupon said moveable contact means is moveable with said differentiating output means only upon reversal of direction of movement of said differentiating output means, such reversal of direction of movement causing concomitant disengagement between said moveable contact and said external fixed contact.

8. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, an external fixed contact in circuit with a means for signaling points of inflection of the first variable with respect to the second variable disposed in the path of movement of said moveable contact means, said moveable contact means being moveable with said differentiating output means only until engagement is made between said moveable contact means and said external fixed contact whereupon said moveable contact means is moveable with said differentiating output means only upon reversal of direction of movement of said differentiating output means, such reversal of direction of movement causing concomitant disengagement between said moveable contact and said external fixed contact, said disengagement effecting response in said means for signaling points of inflection.

9. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, said moveable contact means being disposed between a pair of spaced external opposing fixed contacts in circuit with a means for signaling points of inflection of the first variable with respect to the second variable, said moveable contact means being moveable with said differentiating output means until engagement is made between said moveable contact means and an external fixed contact whereupon said moveable contact means is only moveable upon reversal of direction of movement of said differentiating output means, such reversal of direction of movement causing concomitant disengagement between said moveable contact and external fixed contact.

10. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating ouput means, moveable contact means on said differentiating output means frictionally moveable with said differentiating output means, said moveable contact means being disposed between a pair of spaced external opposing fixed contacts in circuit with a means for signaling points of inflection of the first variable with respect to the second variable, said moveable contact means being moveable with said differentiating output means until engagement is made between said moveable contact means and an external fixed contact whereupon said moveable contact means is only moveable upon reversal of direction of movement of said differentiating output means, such reversal of direction of movement causing concomitant disengagement between said moveable contact and external fixed contact, said disengagement effecting response in said means for signaling points of inflection.

11. An apparatus comprising measuring means for measuring a first variable, differentiating means for differentiating said first variable with respect to a second variable, moveable measuring output means extending from said measuring means to said differentiating means, the movement of said measuring output means constituting a first input to said differentiating means, moveable means responsive to said second variable extending to said differentiating means, the movement of said second variable responsive means constituting a second input to said differentiating means, moveable differentiating output means, moveable contact means on said differentiating output means moveable with said differentiating output means, an external fixed contact in circuit with a means for signaling points of inflection of the first variable with respect to the second variable disposed in the path of movement of said moveable contact means, said moveable contact means being moveable with said differentiating output means only until engagement is made between said moveable contact means and said external fixed contact whereupon said moveable contact means is moveable only upon reversal of direction of movement of said differentiating output means, such reversal of direction of movement causing concomitant disengagement between said moveable contact and said external fixed contact.

References Cited in the file of this patent

UNITED STATES PATENTS

| | | |
|---|---|---|
| 740,547 | Fiske | Oct. 6, 1903 |
| 2,733,391 | Mayer | Jan. 31, 1956 |
| 2,888,195 | Newell et al. | May 26, 1959 |
| 2,967,749 | Strickler | Jan. 10, 1961 |
| 3,028,213 | Hall et al. | Apr. 3, 1962 |

FOREIGN PATENTS

| | | |
|---|---|---|
| 594,793 | Great Britain | Nov. 19, 1947 |

UNITED STATES PATENT OFFICE
CERTIFICATE OF CORRECTION

Patent No. 3,118,058                                 January 14, 1964

Court L. Wolfe

It is hereby certified that error appears in the above numbered patent requiring correction and that the said Letters Patent should read as corrected below.

Column 3, line 44, for "an" read -- any --; column 5, line 27, for "104" read -- 194 --.

Signed and sealed this 23rd day of June 1964.

(SEAL)
Attest:

ERNEST W. SWIDER                                         EDWARD J. BRENNER
Attesting Officer                                             Commissioner of Patents